United States Patent
Whetsel et al.

(10) Patent No.: US 11,626,026 B2
(45) Date of Patent: Apr. 11, 2023

(54) BOILING WATER REACTOR FUEL MOVEMENT SIMULATOR

(71) Applicant: GE-Hitachi Nuclear Energy Americas LLC, Wilmington, NC (US)

(72) Inventors: John C. Whetsel, Wilmington, NC (US); Ricardo Moreno Escudero, La Rioja (ES); Tracey C. Alexander, Vicksburg, MS (US); Robert Steve Alexander, Vicksburg, MS (US); James Francis Killoran, Oswego, NY (US); Corey James Pelton, Wilmington, NC (US); Thomas Edward Deebel, Jr., Wilmington, NY (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 353 days.

(21) Appl. No.: 16/854,021

(22) Filed: Apr. 21, 2020

(65) Prior Publication Data

US 2021/0327293 A1    Oct. 21, 2021

(51) Int. Cl.
*G09B 9/00*        (2006.01)
*G06F 3/01*        (2006.01)

(52) U.S. Cl.
CPC .............. *G09B 9/00* (2013.01); *G06F 3/012* (2013.01)

(58) Field of Classification Search
CPC .................................. G09B 9/00; G21D 3/004
See application file for complete search history.

(56) References Cited

U.S. PATENT DOCUMENTS

| | | | |
|---|---|---|---|
| 4,431,557 A | 2/1984 | Shimizu et al. | |
| 4,699,753 A * | 10/1987 | Rohosky | G09B 9/00 434/218 |
| 7,082,570 B1 * | 7/2006 | von Wiegand | A63F 13/06 345/161 |
| 2016/0349352 A1 * | 12/2016 | Karani | G01S 13/878 |

FOREIGN PATENT DOCUMENTS

| | | |
|---|---|---|
| CN | 102903271 B | 10/2015 |
| CN | 110977981 A | 4/2020 |

OTHER PUBLICATIONS

International Search Report and Written Opinion for PCT/US2021/027382 dated Aug. 5, 2021.

* cited by examiner

*Primary Examiner* — James S. McClellan
(74) *Attorney, Agent, or Firm* — Harness, Dickey & Pierce, P.L.C.

(57) ABSTRACT

A fuel movement simulator system includes a virtual reality (VR) system configured to generate a virtual refuel floor environment; and a fuel movement simulator assembly configured to provide a physical interface to the virtual refuel floor environment, the fuel movement simulator assembly including a replica mast, a replica control console connected to the replica mast, and a support structure configured to support the replica mast and replica control console.

16 Claims, 20 Drawing Sheets

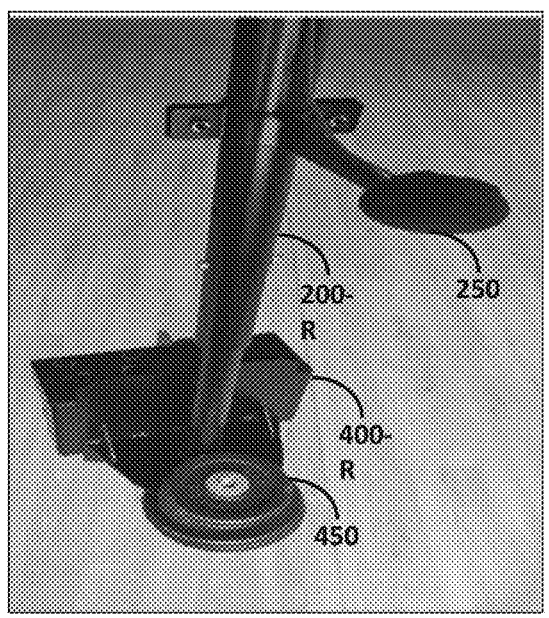
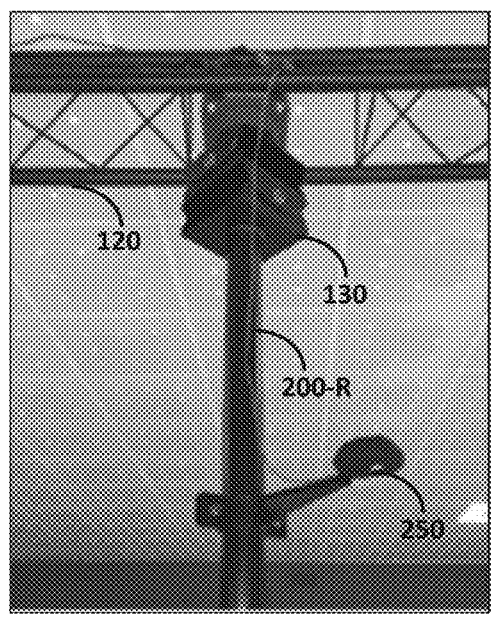
FIG. 2A                FIG. 2B
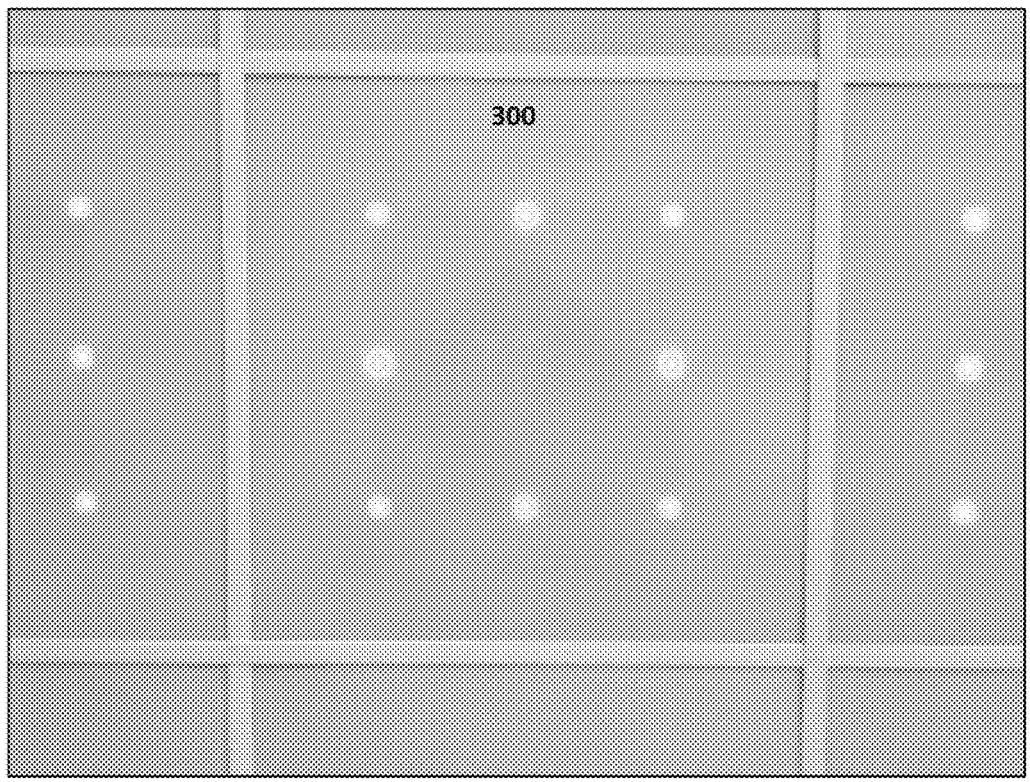
FIG. 3

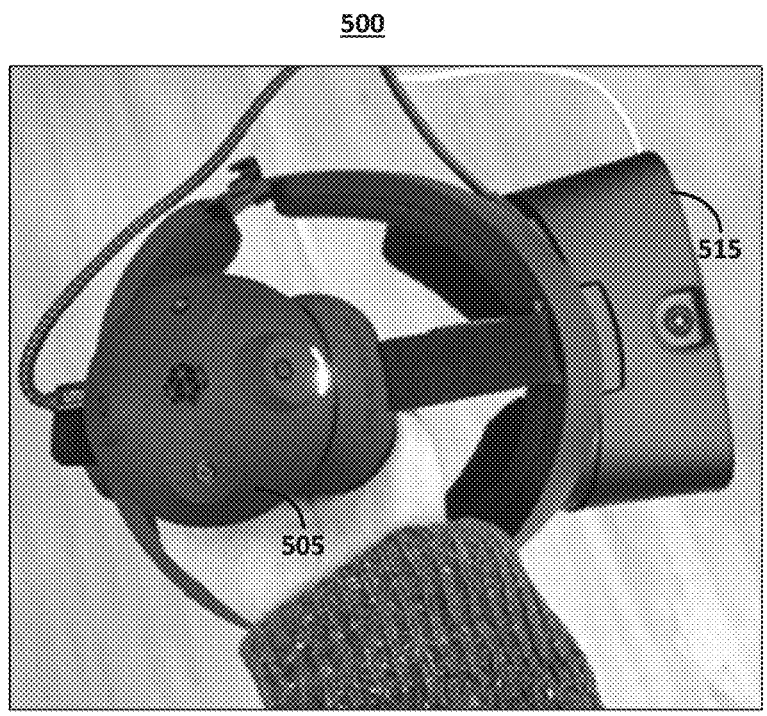
FIG. 5A
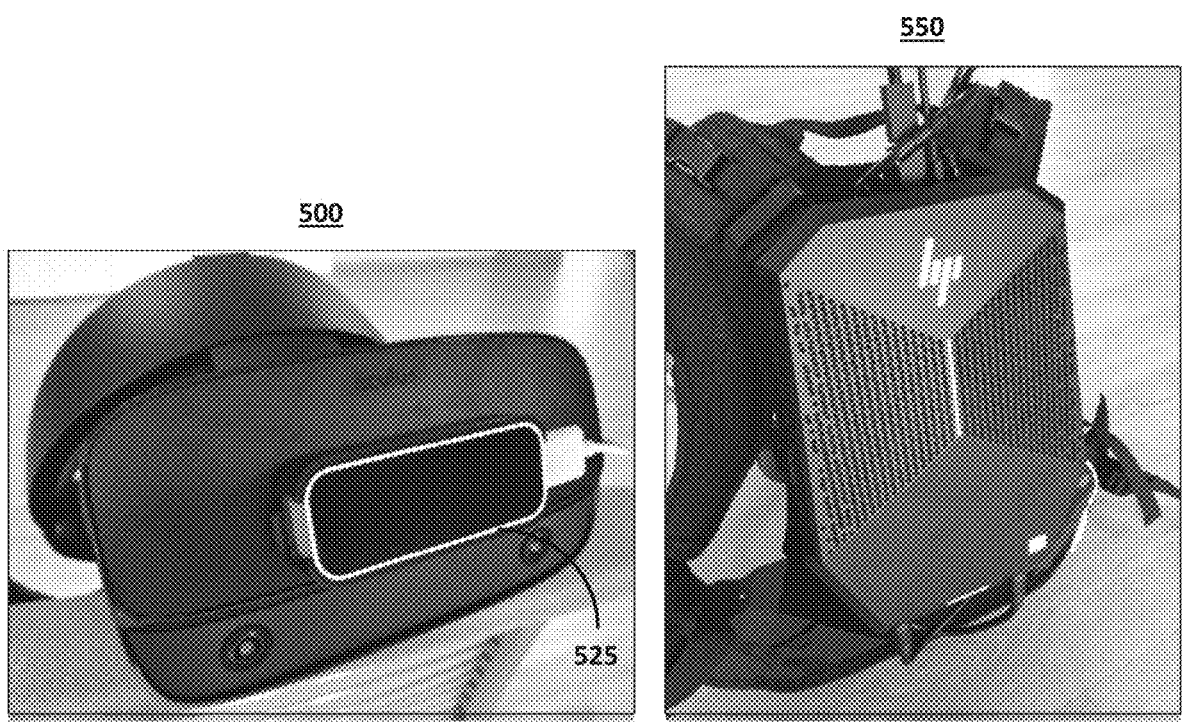
FIG. 5B
FIG. 5C

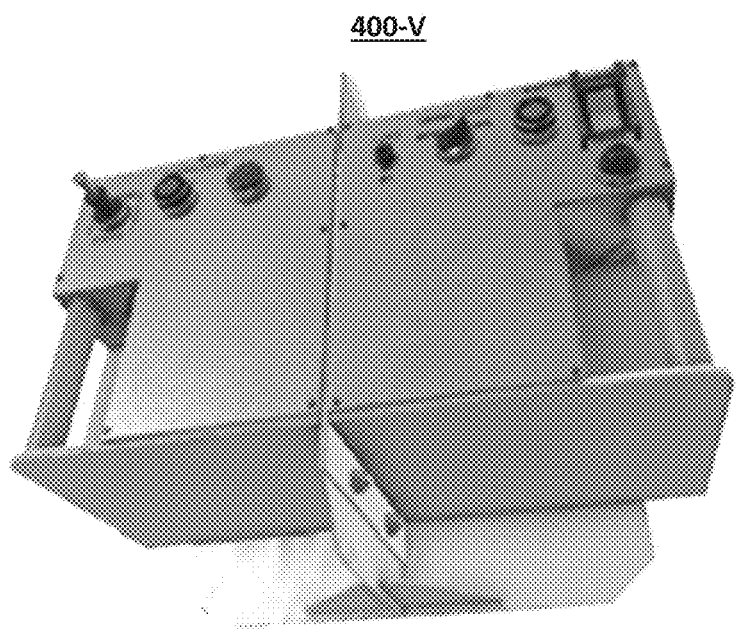
FIG. 6C
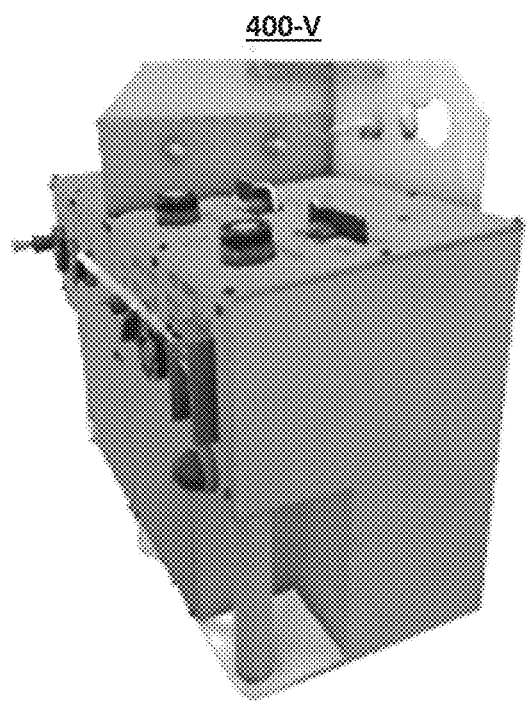 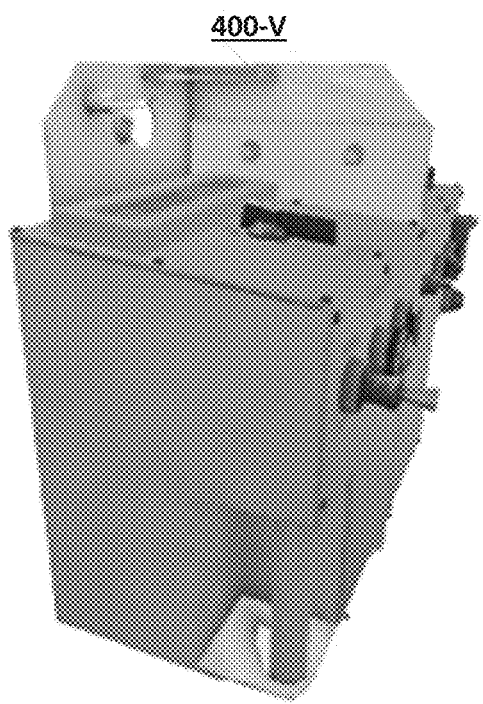
FIG. 6D        FIG. 6E

BOILING WATER REACTOR FUEL MOVEMENT SIMULATOR

BACKGROUND

1. Field

The subject matter disclosed herein relates generally to the field of providing training for complex plant operations and, more specifically, to providing training for boiling water reactor (BWR) refueling operations.

2. Description of Related Art

The operation of a complex process plant, such as a nuclear power plant, includes complicated processes that are performed by teams of knowledgeable and experienced personnel. However, as experienced personnel retire, switch jobs or otherwise leave the service of a particular team at a process plant, the team will need to replace the leaving experienced personnel with new personnel. New personnel may be, for example, less experienced personnel and/or experienced personnel from outside the team. In order for new personnel to become acclimated to performing the complicated processes of a complex process plant safely, it is important for the new personnel to be able to perform training and team building with respect to the aforementioned complicated processes.

Processes performed by a fuel movement team in a refueling or fuel movement operation of a boiling water reactor (BWR) plant are examples of the aforementioned complicated processes. A fuel movement team is formed by utility personnel (Shutdown Reactor Operators or SRO) and non-utility personnel (Fuel Mover and Spotter). Team building is advised and performed in order for the fuel movement team to hone their communication and execution of the fuel movement process prior to an outage such that they can execute the process as efficiently and effectively as possible.

SUMMARY

For several reasons, it has become increasingly difficult to gather these teams at an off-site training facility before the outage.

According to at least some example embodiments, a fuel movement simulator places a physical environment (e.g., a refueling mast and cab) inside of a virtual environment (e.g., a virtual reactor) and allows the two environments to interact. The fuel movement simulator according to at least some example embodiments also allows trainers to interact with the simulation for more effective training and team building.

According to at least some example embodiments, a fuel movement simulator system includes a virtual reality (VR) system configured to generate a virtual refuel floor environment; and a fuel movement simulator assembly configured to provide a physical interface to the virtual refuel floor environment, the fuel movement simulator assembly including a replica mast, a replica control console connected to the replica mast, and a support structure configured to support the replica mast and replica control console.

The support structure may include a connector, and the replica mast may be connected to the connector.

The connector may be configured to support one or more degrees of freedom such that the replica mast and replica console are movable relative to the support structure.

The support structure may further include a plurality of vertical supports; and a horizontal support supported by the plurality of vertical supports.

The connector may be connected to the horizontal support, and the replica mast may be connected to the horizontal support via the connector such that the replica console is rotatable about a central axis of the replica mast relative to the horizontal support.

The VR system may include a plurality of tracker ceiling panels configured to emit infrared (IR) light.

The replica mast may include a sensor configured to generate signals indicating an orientation of the replica mast based on IR light emitted by one or more of the plurality of tracker ceiling panels.

The VR system may further include a VR headset including a tracker configured to generate signals for tracking a position and of a user wearing the VR headset based on IR light emitted by one or more of the plurality of tracker ceiling panels, and a VR display configured to display, to the user, a scene of the virtual refuel floor environment.

The VR system may be configured to generate the refuel floor environment such that the refuel floor environment includes a virtual fuel moving cab, a reactor pool, and a reactor core inside the reactor pool.

The virtual fuel moving cab may include a virtual mast and a virtual control console corresponding to the replica mast and replica control console, respectively.

According to at least some example embodiments, a fuel movement simulator assembly includes a replica mast; a replica control console connected to the replica mast; and a support structure configured to support the replica mast and replica control console.

The support structure may include a connector, and the replica mast may be connected to the connector.

The connector may be configured to support one or more degrees of freedom such that the replica mast and replica console are movable relative to the support structure.

The support structure may further include a plurality of vertical supports; and a horizontal support supported by the plurality of vertical supports.

The connector may be connected to the horizontal support and the replica mast may be connected to the horizontal support via the connector such that the replica console is rotatable about a central axis of the replica mast relative to the horizontal support.

The replica mast may include a sensor configured to generate signals indicating an orientation of the replica mast.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2A illustrates a connection between a replica mast and replica control console of the fuel movement simulator assembly of FIG. 1B.

FIG. 2B illustrates a connection between a replica mast and support structure of the fuel movement simulator assembly of FIG. 1B.

FIG. 3 illustrates a tracker ceiling panel of the fuel movement simulator system of FIG. 1A according to at least some example embodiments.

FIGS. 5A and 5B illustrate various view of a virtual reality (VR) display and tracker headset included in a VR system of the fuel movement simulator system of FIG. 1A.

FIG. 5C illustrates a VR processor included in a VR system of the fuel movement simulator system of FIG. 1A.

FIGS. 6A-6E illustrate various views of a virtual control console according to at least some example embodiments.

DETAILED DESCRIPTION

Figure 1A:
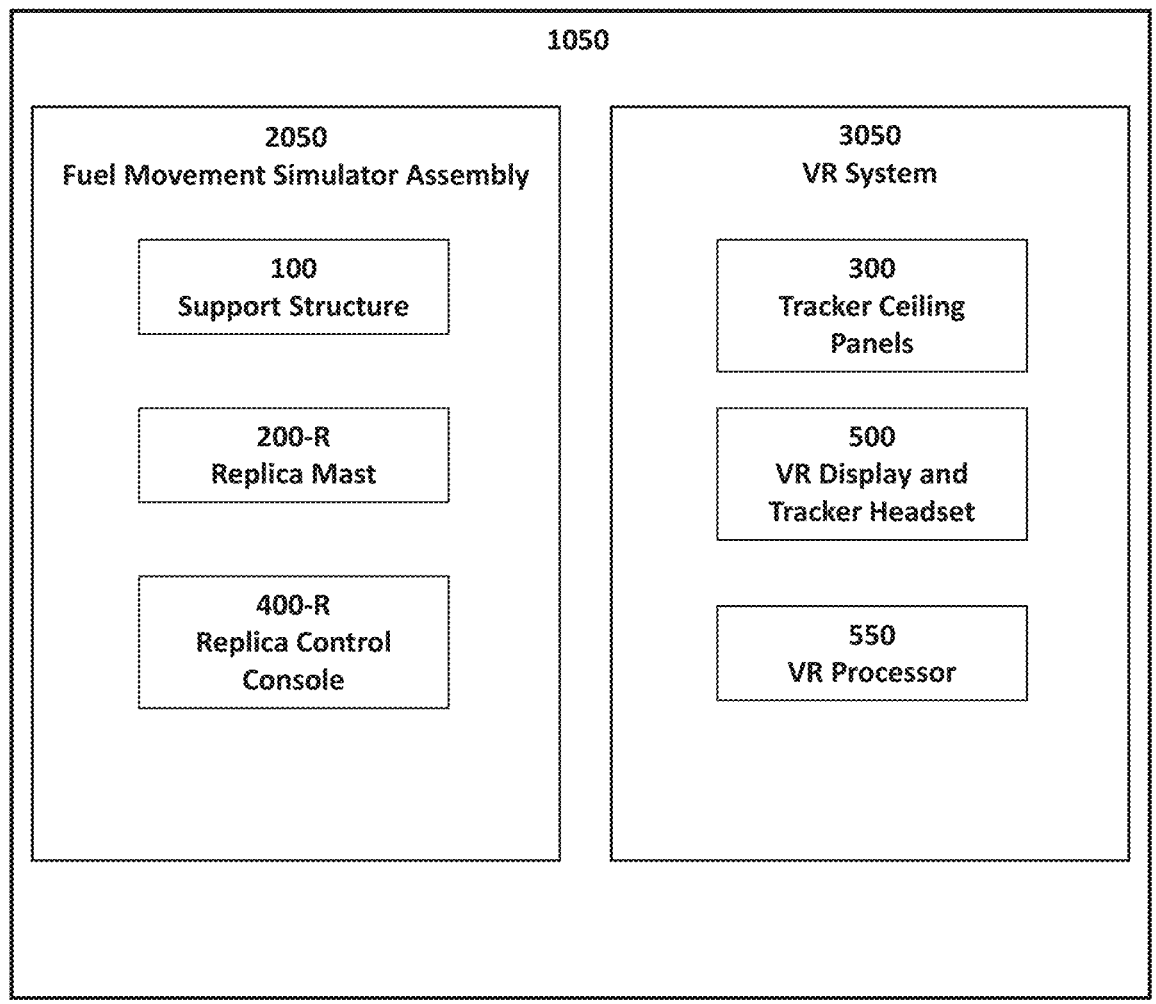
FIG. 1A is a block diagram illustrating a fuel movement simulator system according to at least some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a block diagram illustrating a fuel movement simulator system 1050 according to at least some example embodiments. The fuel movement simulator system 1050 includes a fuel movement simulator assembly 2050 and a virtual reality (VR) system 3050. The VR system 3050 provides a user with a visual interface to a virtual refuel floor environment. Further, the VR system 3050 performs positional tracking and head tracking in order to update the visual interface in accordance with the spatial position and gaze direction of the user. The fuel movement simulator assembly 2050 is a tangible, physical device that provides the user with a physical interface to the virtual refuel floor environment generated by the VR system 3050. For example, the fuel movement simulator assembly 2050 includes physical elements which a user can physically manipulate in order control aspects of the virtual refuel floor environment. According to at least some example embodiments, the fuel movement simulator assembly 2050 and the VR system 3050 transmit signals to each other via wired and/or wireless connections between the fuel movement simulator assembly 2050 and the VR system 3050.

Figure 1B:
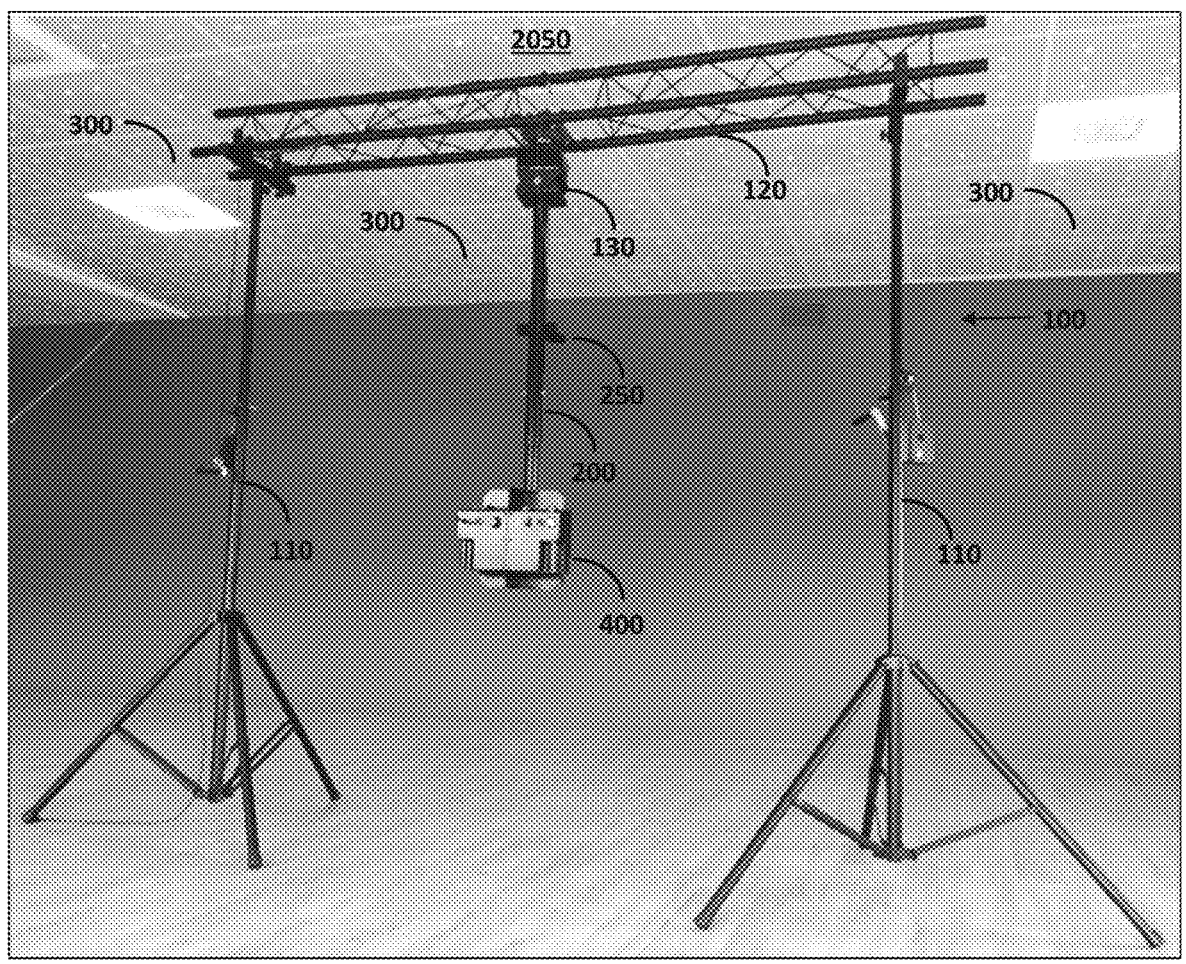
FIG. 1B illustrates a fuel movement simulator assembly included in the fuel movement simulator of FIG. 1A according to at least some example embodiments.

FIG. 1B illustrates a fuel movement simulator assembly 2050 included in the fuel movement simulator system 1050 according to at least some example embodiments. According to at least some example embodiments, FIG. 1B illustrates the interior of a portable enclosure (e.g., a trailer) in which the fuel movement simulator assembly 2050 may be located. Referring to FIGS. 1A and 1B, the fuel movement simulator assembly 2050 includes a support structure 100 that supports a replica mast 200-R and replica control console 400-R that is connected to the replica mast 200-R. FIG. 2A illustrates a connection between the replica mast 200-R and replica control console 400-R of the fuel movement simulator assembly 2050. FIG. 2B illustrates a connection between the replica mast 200-R and the support structure 100 of the fuel movement simulator assembly 2050. As will be discussed in greater detail below, the replica mast 200-R includes a sensor 250.

Referring to FIGS. 1B, 2A and 2B, the fuel movement simulator assembly 2050 includes a number of vertical supports 110 (e.g., 2) which are each connected to, and support, a horizontal support 120. According to at least some example embodiments, the replica mast 200-R may be connected to the horizontal support 120 via a connector 130. According to at least some example embodiments, the connector 130 supports one or more degrees of freedom, thus allowing the replica mast 200-R, and the replica control console 400-R connected thereto, to move relative to the support structure 100. For example, the connector 130 may be connected in between the horizontal support 120 and the replica mast 200-R such that the replica mast 200-R and control console 400 can rotate about a central axis of the replica mast 200-R (e.g., in a clockwise and/or counter-clockwise direction). As is illustrated in FIG. 2A, the replica control console may include a counterbalance 450 which may be a weight (or weights) for preventing the replica control console 400-R from becoming unbalanced due to a weight of a front portion of the replica control console 400-R.

According to at least some example embodiments, an orientation of the replica control console 400-R may be tracked. For example, referring to FIGS. 2A and 2B, the replica mast 200-R may include a sensor 250 for tracking an orientation of the replica control console 400-R based on light (e.g., infrared (IR) light) emitted from tracker ceiling panels. FIG. 3 illustrates a tracker ceiling panel 300 of the VR system 3050 illustrated in FIG. 1A. The VR system 3050 may further include a VR display and tracker headset 500 and VR processor 550, each of which will be discussed in greater detail below with reference to FIGS. 5A-5C.

Returning to FIGS. 1B-3, a ceiling above the fuel movement simulator assembly 2050 may include a plurality of tracker ceiling panels 300. According to at least some example embodiments, the tracker ceiling panels 300 may be Virtualware NMerso ceiling panels. According to at least some example embodiments, the sensor 250 may use infrared (IR) light emitted by tracker ceiling panels 300 in order to generate an indication of an orientation of the replica control console 400-R (e.g., a degree of rotation about the central axis of the replica mast 200-R). According to at least some example embodiments, the sensor 250 provides the indication of the orientation of the replica control console 400-R to the VR system 3050 (e.g., the VR processor 550) via a wired and/or wireless connection between the fuel movement simulator assembly 2050 and the VR system 3050 (e.g., the VR processor 550). According to at least some example embodiments, the tracker ceiling panels 300 may be an array of panels or tiles located on a ceiling of a room or, for example, a portable trailer, that houses the fuel movement simulator system 1050.

Figure 4A:
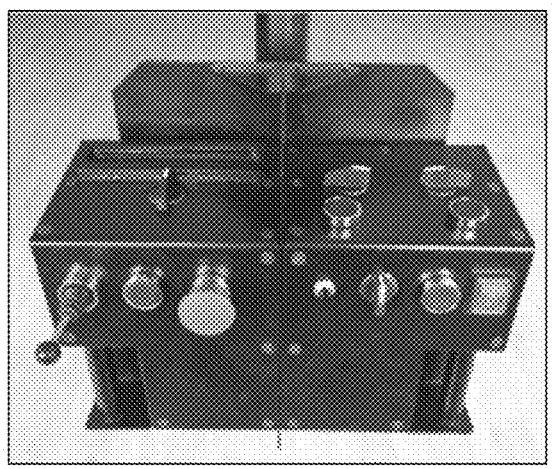
FIGS. 4A-4F illustrate various views of a replica control console of the fuel movement simulator assembly of FIG. 1B.
Figure 4B:
Figure 4C:
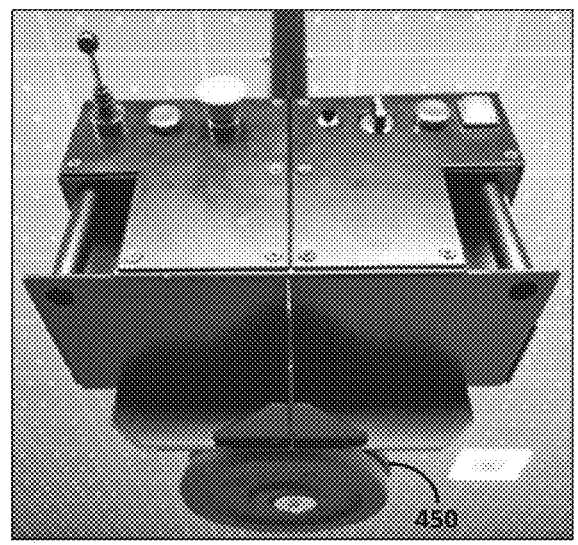
Figure 4D:
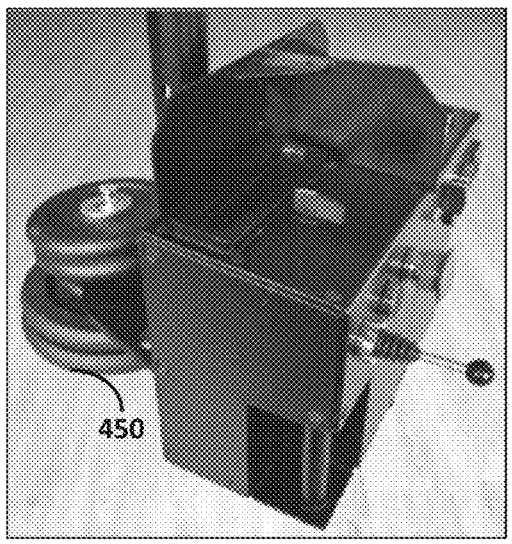
Figure 4E:
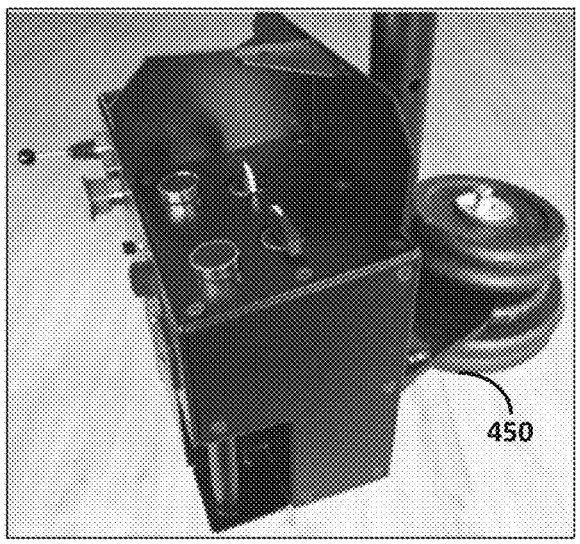
Figure 4F:
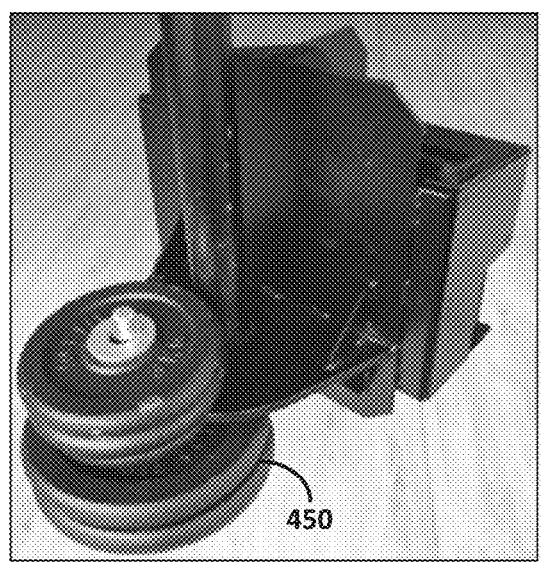

FIGS. 4A-4F illustrate various views of the replica control console 400-R of the fuel movement simulator assembly 2050. FIGS. 4A and 4B illustrate first and second perspective views of the replica control console 400-R from a viewing position above the replica control console 400-R, while the replica control console 400-R has a front-facing orientation. FIG. 4C illustrates a perspective view of the replica control console 400-R from a viewing position below the replica control console 400-R, while the replica control console 400-R has a front-facing orientation. FIG. 4D illustrates a perspective view of the replica control console 400-R from a viewing position above the replica control console 400-R, while the replica control console 400-R is rotated in a counter-clockwise direction relative to a front-facing orientation. FIG. 4E illustrates a perspective view of the replica control console 400-R from a viewing position above the replica control console 400-R, while the replica control console 400-R is rotated in a clockwise direction relative to a front-facing orientation. FIG. 4F illustrates a perspective view of the replica control console 400-R from a viewing position above the replica control console 400-R, while the replica control console 400-R has a substantially back-facing orientation.

As is illustrated in FIGS. 4A-4F, the replica control console 400-R is a tangible, physical element that includes a plurality of tangible, manipulatable controls. The particular arrangement of controls included on the replica control console 400-R, and the general dimensions of the replica control console 400-R, may be chosen in accordance with the preferences of a designer, manufacturer and/or operator of the fuel movement simulator system 1050. For example, the particular arrangement of controls included on the replica control console 400-R, and the general dimensions of the replica control console 400-R, may be chosen to mirror the controls and/or general dimensions of a particular model of control console (e.g., a particular model of control console used in the nuclear reactor in which the refueling operations being practiced by a user are to be performed). In the present specification, the terms "refueling" and "fuel movement" are considered synonymous and may be used interchangeably. According to at least some example embodiments, when one or more controls of the replica control console 400-R are manipulated, the replica control console 400-R generates signals indicating the manipulated control(s) and the nature of the manipulation. According to at least some example embodiments, the control console 400-R transmits the generated signals to the VR system 3050 (e.g., the VR processor 550) via a wired and/or wireless connection between the fuel movement simulator assembly 2050 and the VR system 3050 (e.g., the VR processor 550).

According to at least some example embodiments, the replica control console 400-R may contain one or more electric motors for generating haptic feedback. Examples sensations of the haptic feedback that the replica control console 400-R may replicate include, but are not limited to:
- the feeling of landing on a bail handle;
- the feeling of entering the reactor core or spent fuel pool rack;
- the way it feels to raise and/or lower a fuel bundle while the fuel bundle is still in the core/rack;
- the feeling and sound of a mast section transfer of weight;
- the feeling of a fuel assembly leaner when entering the core; and
- the feeling of a drift of the mast when the mast starts and stops moving.

FIGS. 5A and 5B illustrate various views of a virtual reality (VR) display and tracker headset 500 included in the VR system 3050 of the fuel movement simulator system 1050 of FIG. 1A. FIG. 5C illustrates a VR processor 550 included in a VR system 3050 of the fuel movement simulator system 1050 of FIG. 1A. Referring to FIGS. 5A and 5B, according to at least some example embodiments, the VR processor 550 may be, or include, processing circuitry such as hardware including logic circuits; a hardware/software combination executing software; or a combination thereof. For example, the processing circuitry more specifically may include, but is not limited to, a central processing unit (CPU), a graphics processing unit (GPU), an arithmetic logic unit (ALU), a digital signal processor, a microcomputer, a field programmable gate array (FPGA), and programmable logic unit, a microprocessor, application-specific integrated circuit (ASIC), etc.

According to at least some example embodiments, the VR display and tracker headset 500, which may also be referred to in the present specification as the VR headset 500, is configured to be worn on the head of a user and includes a tracker 505, a VR display 515, and a motion sensor 525. According to at least some example embodiments, the tracker 505 may generate signals for tracking a position of a user wearing the VR display and tracker headset 500 and an orientation of a head of the user (e.g., based on IR light emitted by the tracker ceiling panels 300), and the motion sensor 525 may reduce a latency with which changes in an orientation of the user's head are detected by the tracker 505. Further, the VR display 515 may display, to the user, an immersive, 3-dimensional scene of a virtual refueling floor environment. According to at least some example embodiments, the VR display 515 may be VR display goggles that are worn in proximity of the eyes of a user of the VR display and tracker headset 500 and are configured to provide the user with a stereoscopic image such the user perceives depth with respect to the provided image. Further, the VR processor 550 may perform the computation necessary to update the VR scene displayed to the user via the VR display 515 based on the tracked position and head orientation of the user detected based on signals output by the tracker 505 and motion sensor 525, and based on signals received from the fuel movement simulator assembly 2050 indicating one or more of an orientation of the replica control console 400-R (e.g., from the sensor 250) and controls of the control console 400-R that have been manipulated and the manner in which the controls were manipulated (e.g., from the replica control console 400-R). Operations described in the present specification as being performed by the VR system 3050, or an element thereof (e.g., the VR display and tracker headset 500), may be performed and/or controlled by the VR processor 550. According to at least some example embodiments, the VR display and tracker headset 500 may be a Virtualware NMerso tracker. According to at least some example embodiments, the VR processor 550 may be a HP® VR backpack G2.

The virtual environment that is displayed to a user of the VR display and tracker headset 500 on the basis of the above-referenced position tracking and head orientation tracking performed by the VR display and tracker headset 500 will now be discussed in greater detail below with reference to FIGS. 6A-11.

Figure 6A:
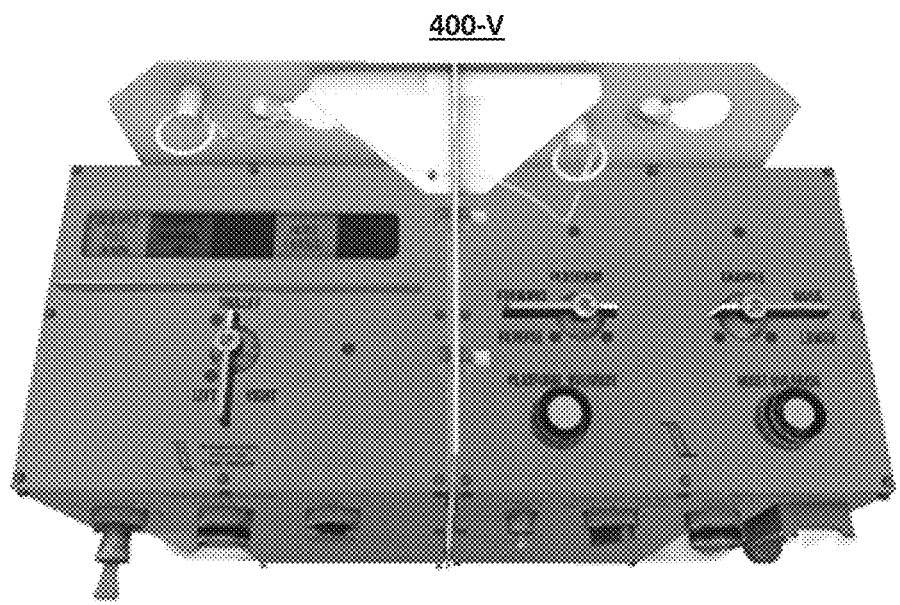
Figure 6B:
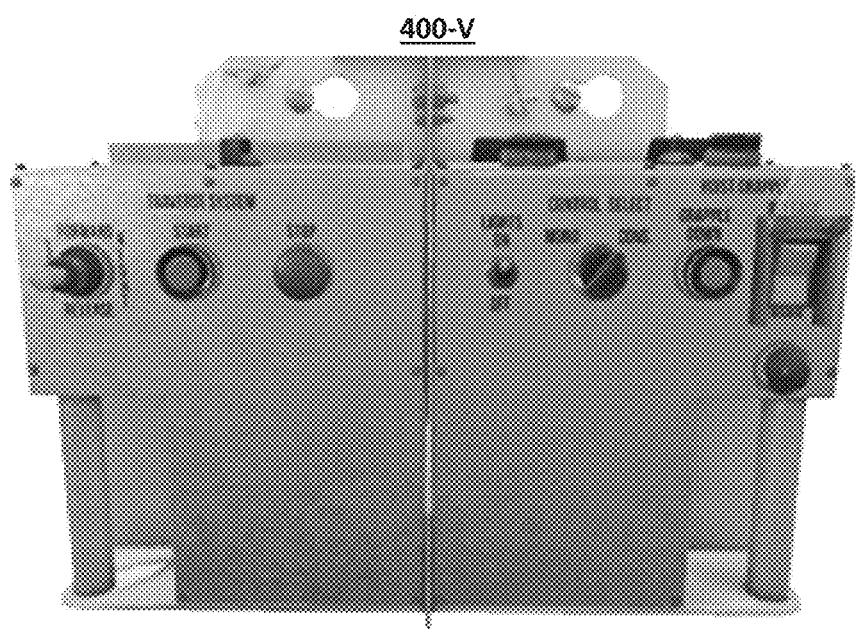

Referring to FIGS. 6A-6E, FIG. 6A illustrates an upper surface of the virtual control console 400-V from a viewing position above the virtual control console 400-V, while the virtual control console 400-V has a front-facing orientation. FIG. 6B illustrates a front surface of the virtual control console 400-V from a viewing position in front of the virtual control console 400-V, while the virtual control console 400-V has a front-facing orientation. FIG. 6C illustrates a perspective view of the virtual control console 400-V from a viewing position below the virtual control console 400-V, while the virtual control console 400-V has a substantially front-facing orientation. FIG. 6D illustrates a perspective view of the virtual control console 400-V from a viewing position slightly above the virtual control console 400-V, while the virtual control console 400-V is rotated in a clockwise direction relative to the front-facing orientation. FIG. 6E illustrates a perspective view of the virtual control console 400-V from a viewing position slightly above the virtual control console 400-V, while the virtual control console 400-V is rotated in a counter-clockwise direction relative to the front-facing orientation.

Figure 7A:
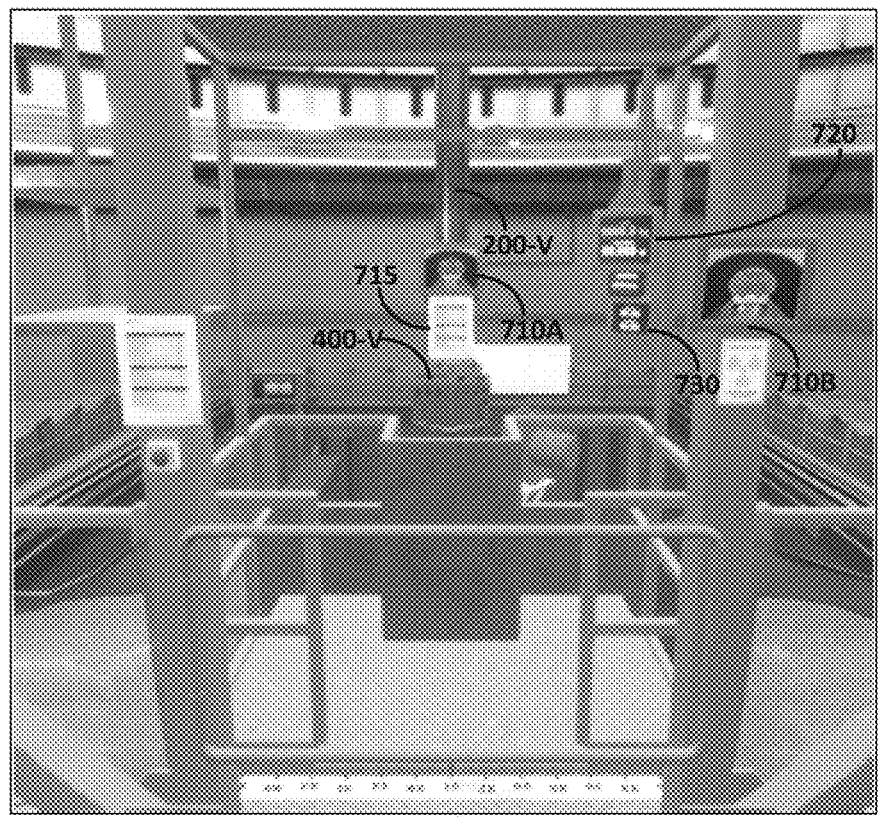
FIGS. 7A and 7B illustrate various views of a virtual fuel moving platform cab according to at least some example embodiments.
Figure 7B:
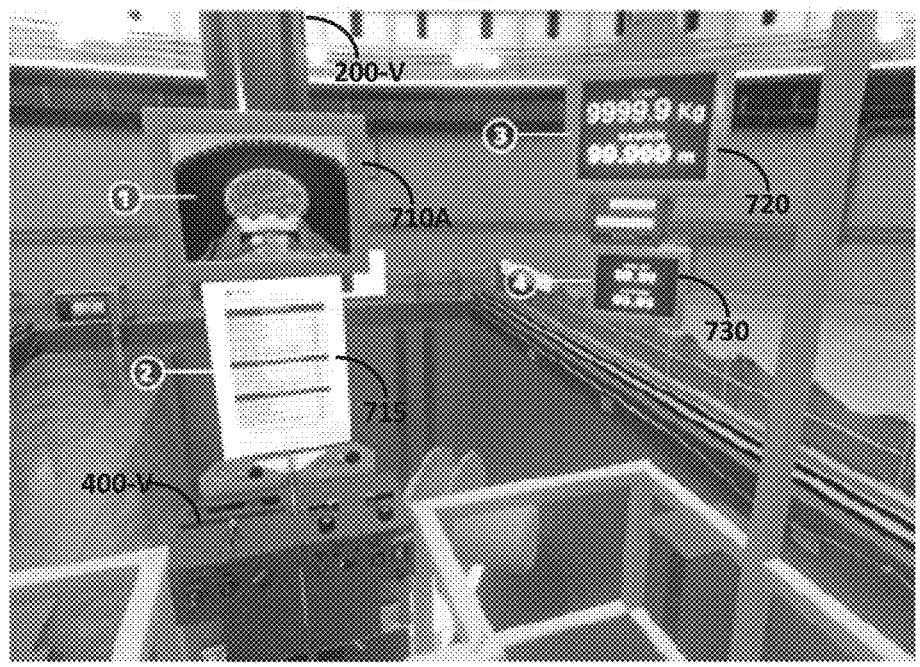

FIGS. 7A and 7B illustrate various views of a virtual fuel moving platform cab 700 according to at least some example embodiments. Referring to FIGS. 7A and 7B, the virtual fuel moving platform cab 700 includes the virtual control controls 400-V, which is connected to a virtual mast 200-V. The virtual fuel moving platform cab 700 further includes a front mast camera monitor 710A and a rear mast camera monitor 710B. According to at least some example embodiments, the front mast camera monitor 710A is used by a user (e.g., fuel mover) who is training to perform a refueling operation, and the rear mast camera monitor 710B, which displays the same content as the front mast camera monitor 710A, is used by a Senior Reactor Operator (SRO), and/or a training supervisor and/or the user who is training the spotter role. Referring to FIGS. 7A and 7B, the virtual fuel moving platform cab 700 further includes an elevation sheet 715, load and elevation readouts 720, and coordinates readouts 730.

Figure 8A:
FIGS. 8A-8C illustrate various views of a virtual refuel floor of boiling water reactor (BWR) reactor according to at least some example embodiments.
Figure 8B:
Figure 8C:
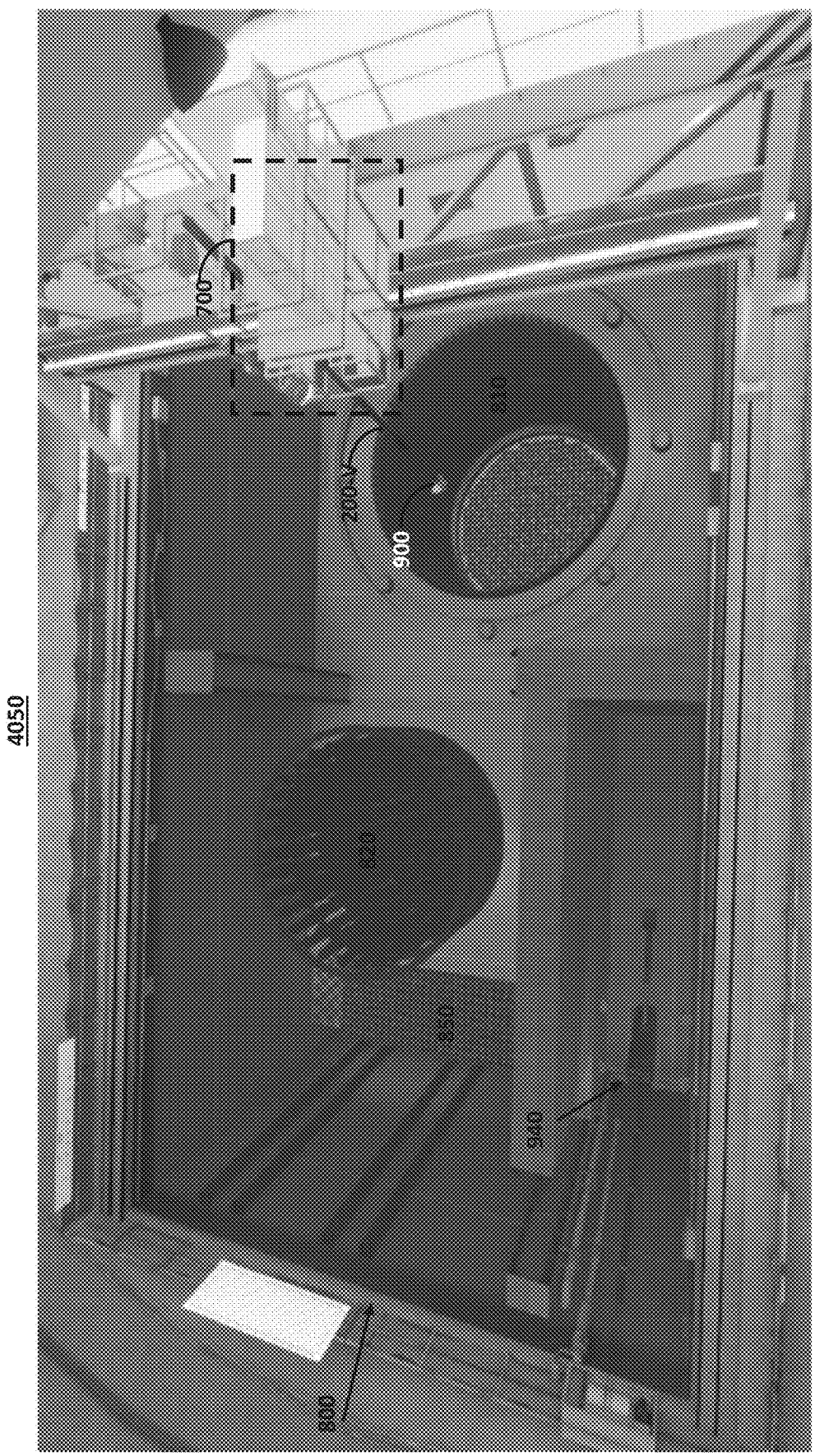

FIGS. 8A-8C illustrate various views of a virtual refuel floor environment 4050 of boiling water reactor (BWR) reactor according to at least some example embodiments. Referring to FIGS. 8A-8C the virtual refuel floor environment 4050 may include, for example, the virtual fuel moving platform cab 700, the virtual mast 200-V, a virtual mast grapple 900 attached to the end of the virtual mast 200-V, a reactor vessel head 830, and a reactor pool 800. Within the reactor pool, there is a reactor vessel core 810, a separator 820, a dryer 840, a spent fuel pool 850, and a virtual inclined fuel transfer system (IFTS) transfer tube 940.

Figure 9B:
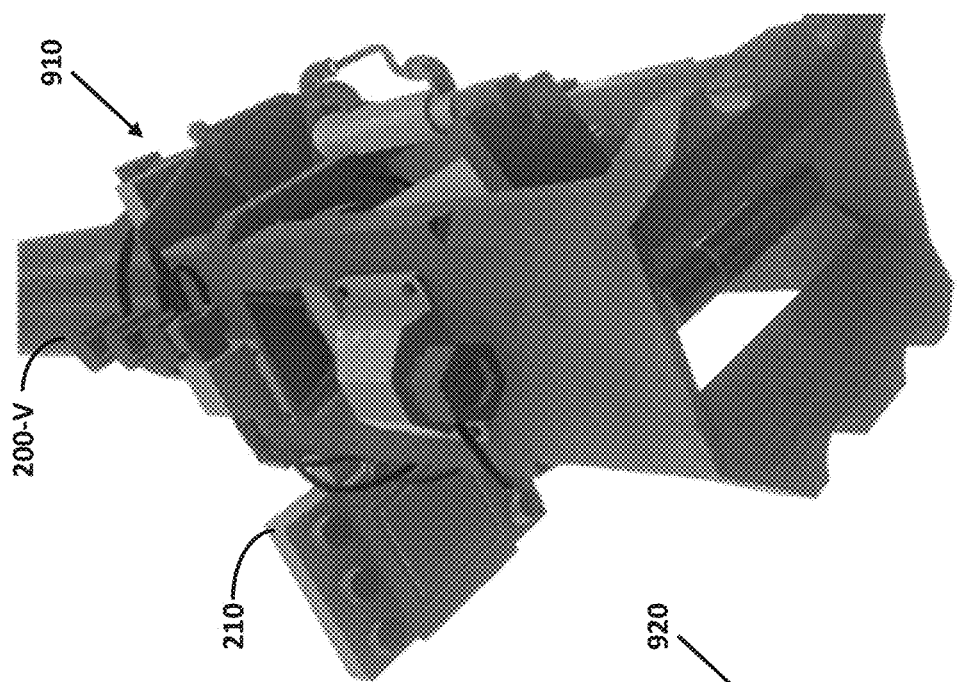
FIGS. 9A and 9B illustrate various views of a virtual mast grapple according to at least some example embodiments.
Figure 10:
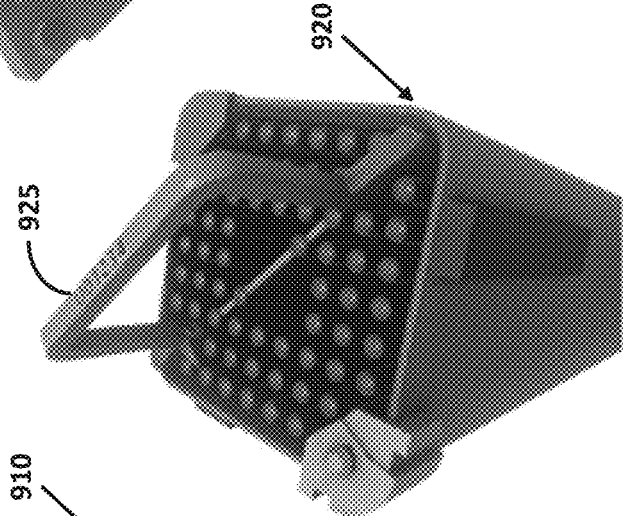
FIG. 10 illustrates a perspective view of a of a virtual fuel bundle according to at least some example embodiments.
Figure 9A:
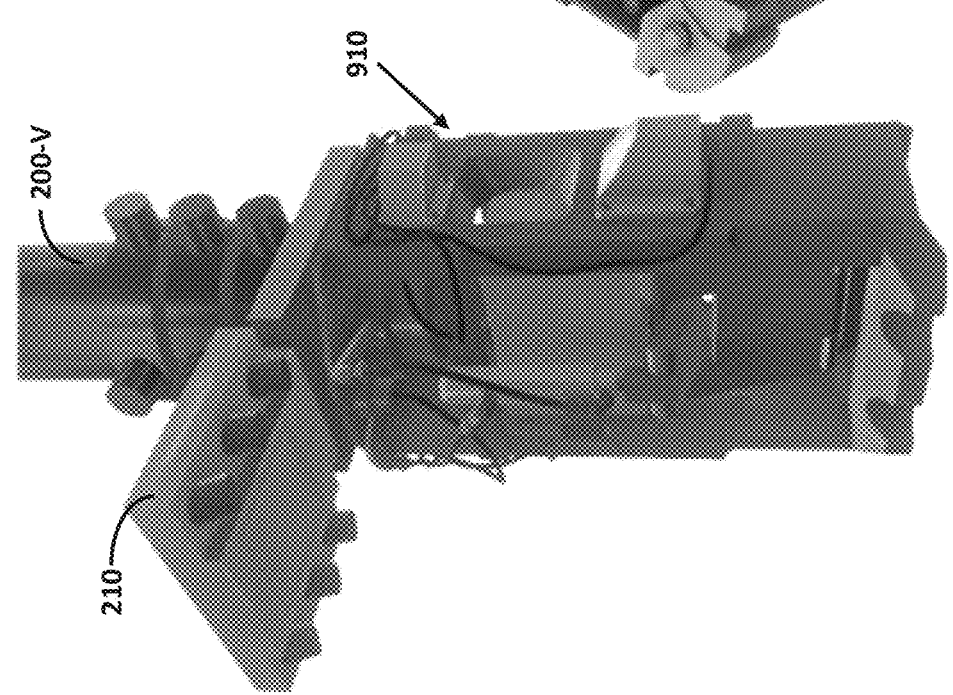
Figure 11:
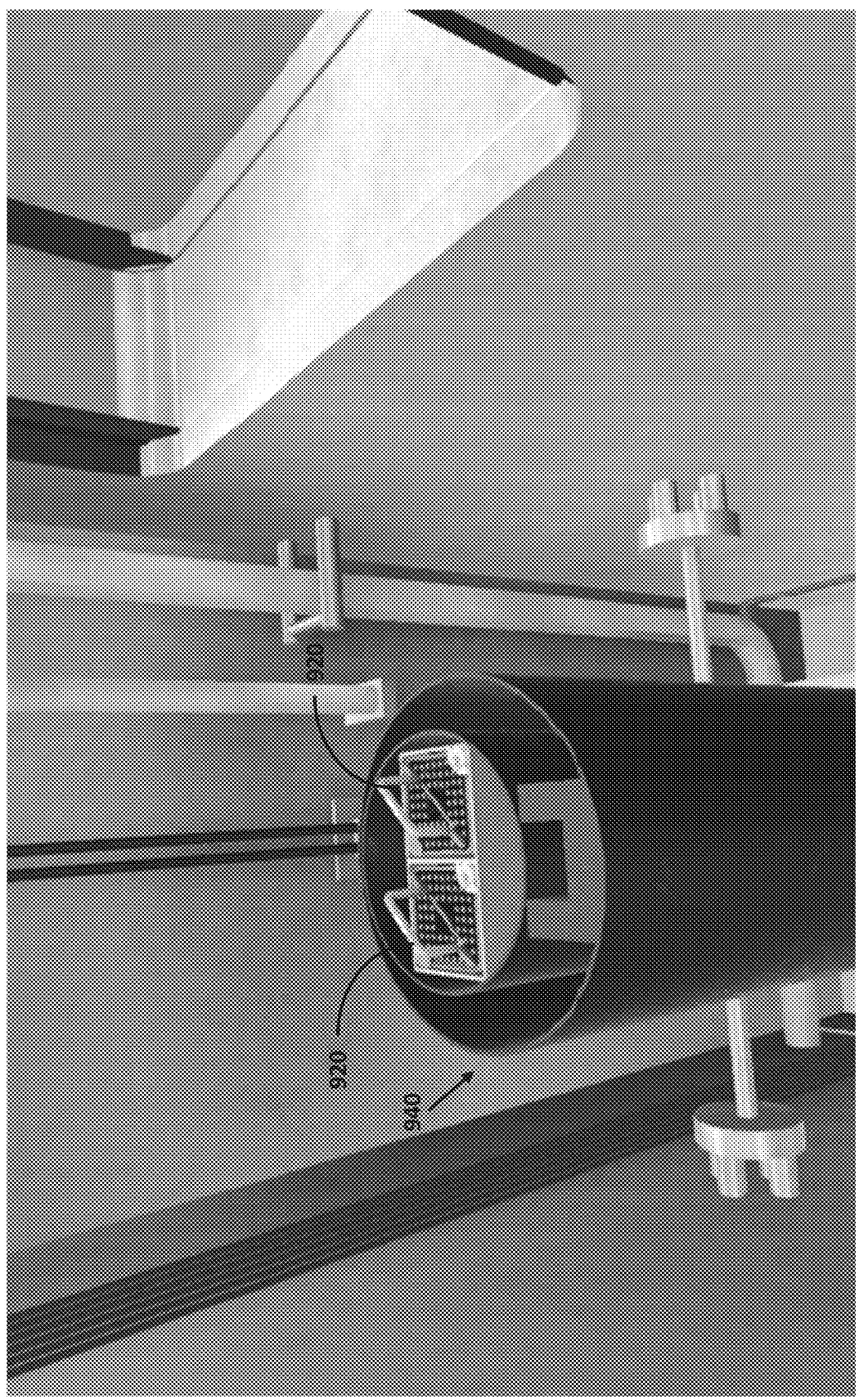
FIG. 11 illustrates a virtual inclined fuel transfer system (IFTS) transfer tube according to at least some example embodiments.

FIGS. 9A and 9B illustrate various views of the virtual mast grapple 900 according to at least some example embodiments. FIG. 10 illustrates a perspective view of a of a virtual fuel bundle 920 according to at least some example embodiments. Referring to FIGS. 9A-10, the virtual mast grapple 900 may include a mast camera 210 which is used to follow the mast evolution and to read a fuel ID number 925 from the virtual fuel bundle 920. FIG. 11 illustrates the virtual IFTS transfer tube 940 according to at least some example embodiments. Referring to FIG. 11, a user may operate the virtual mast grapple 900 to transfer virtual fuel bundles 920 to the virtual IFTS transfer tube 940.

FIGS. 12A-22B include images of users interacting with the physical fuel movement simulator assembly 2050 alongside corresponding images from the virtual refuel floor environment created by the VR system 3050.

Figures 12A, 12B:
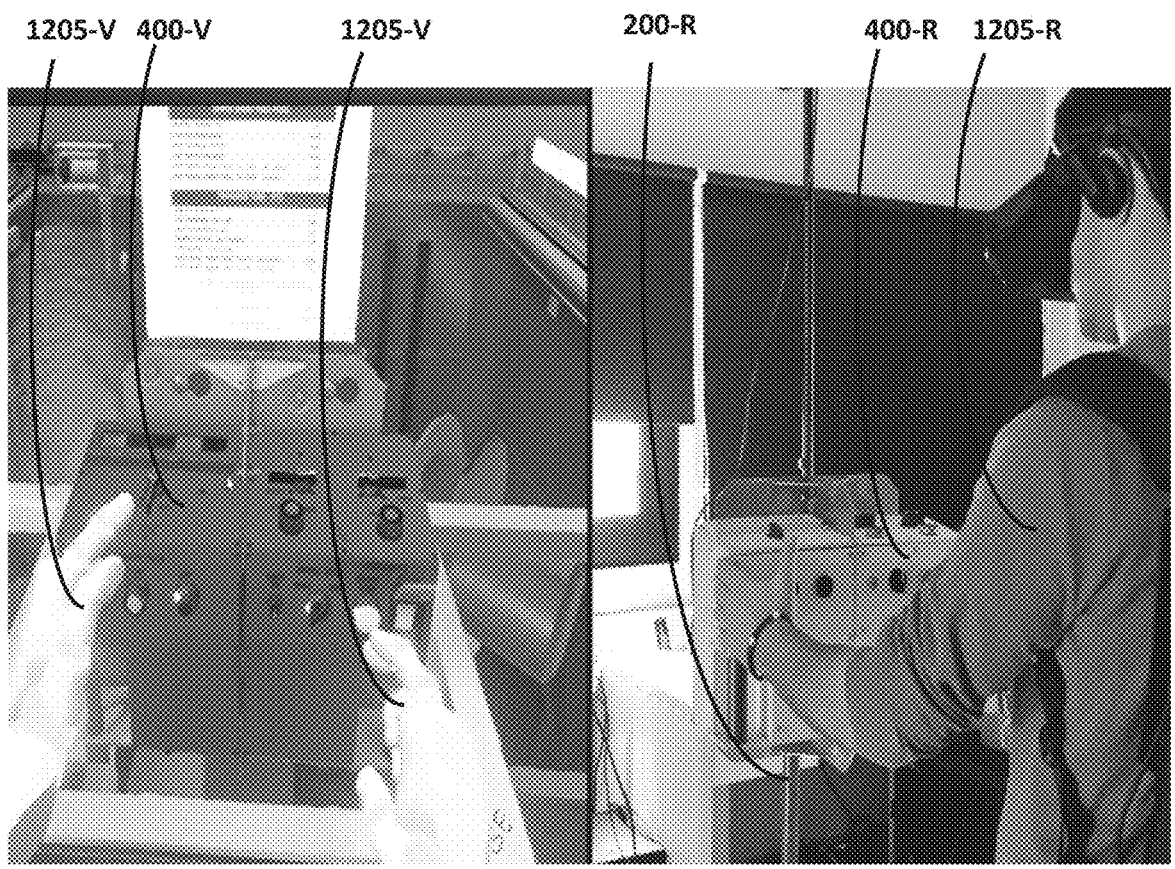
FIGS. 12A and 12B illustrate an example of a user (e.g., fuel mover) 1205-R manipulating a replica control console, and an example of a corresponding scene of a virtual refuel floor environment provided to a VR display of the user 1205-R, respectively, according to at least some example embodiments. The scene of a virtual refuel floor environment is provided from the perspective of a corresponding virtual avatar 1205-V.

For example, FIG. 12A shows an example of a user (e.g., fuel mover) 1205-R manipulating a replica control console and FIG. 12B shows the corresponding scene of the virtual refuel floor environment 4050 provided to a VR display 515 of the user (e.g., fuel mover) 1205.-R. As is illustrated in FIG. 12B, the scene provided to the VR display 515 of the user (e.g., fuel mover) 1205-R may include at least a portion (e.g. hands, arms, etc.) of a user virtual avatar 1205-V, which is a virtual avatar of the user (e.g., fuel mover) 1205-R.

Figures 13B, 14B:
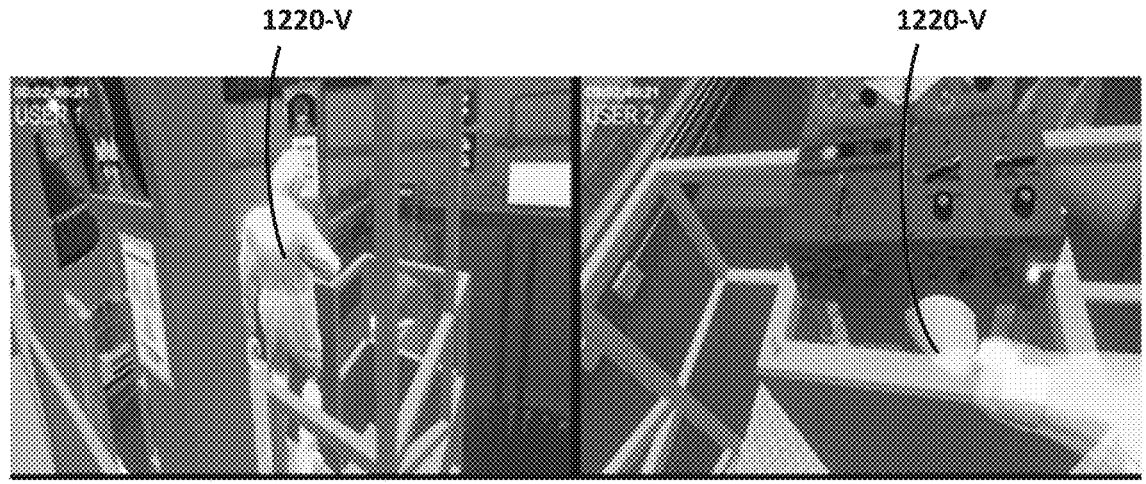
FIGS. 13A and 13B illustrate an example of a first user (e.g., spotter) 1210-R supervising a second user (e.g., fuel mover) 1220-R who is performing a fuel movement training operation, and an example of a corresponding scene of a virtual refuel floor environment provided to a VR display of the first user, respectively, according to at least some example embodiments.
FIGS. 14A and 14B illustrate an example of the second user (e.g., fuel mover) 1220-R performing the fuel movement training operation, and an example of a corresponding scene of a virtual refuel floor environment provided to a VR display of the second user (e.g., fuel mover) 1220-R, respectively, according to at least some example embodiments.
Figures 13A, 14A:
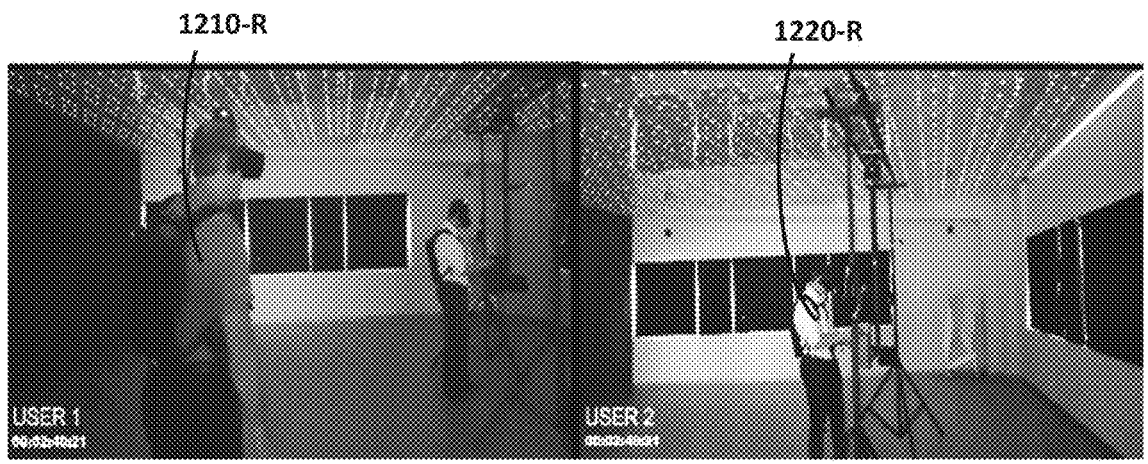

Additionally, as is discussed in greater detail below, FIGS. 13A-22B illustrate a first user (e.g., spotter) 1210-R and a second user (e.g., fuel mover) 1220-R in various positions and orientations, and corresponding scenes of the virtual refuel floor environment 4050 provided to the VR displays of the first user (e.g., spotter) 1210-R and a second user (e.g., fuel mover) 1220-R. Some of FIGS. 13A-22B also illustrate a second user virtual avatar 1220-V (i.e., a virtual avatar of the second user (e.g., fuel mover) 1220-R) within scenes of the virtual refuel floor environment 4050 provided to the VR displays of the first user (e.g., spotter) 1210-R and a second user (e.g., fuel mover) 1220-R. FIG. 13A illustrates an example of a first user (e.g., spotter) 1210-R supervising a second user (e.g., fuel mover) 1220-R who is performing a fuel movement training operation and FIG. 13B shows the corresponding scene of a virtual refuel floor environment 4050 provided to a VR display 515 of the first user (e.g., spotter) 1210-R. FIG. 14A illustrates an example of the second user (e.g., fuel mover) 1220-R performing a fuel movement training operation, and FIG. 14B shown an example of a corresponding scene of a virtual refuel floor environment 4050 provided to the VR display 515 of the second user (e.g., fuel mover) 1220-R.

Figures 15B, 16B:
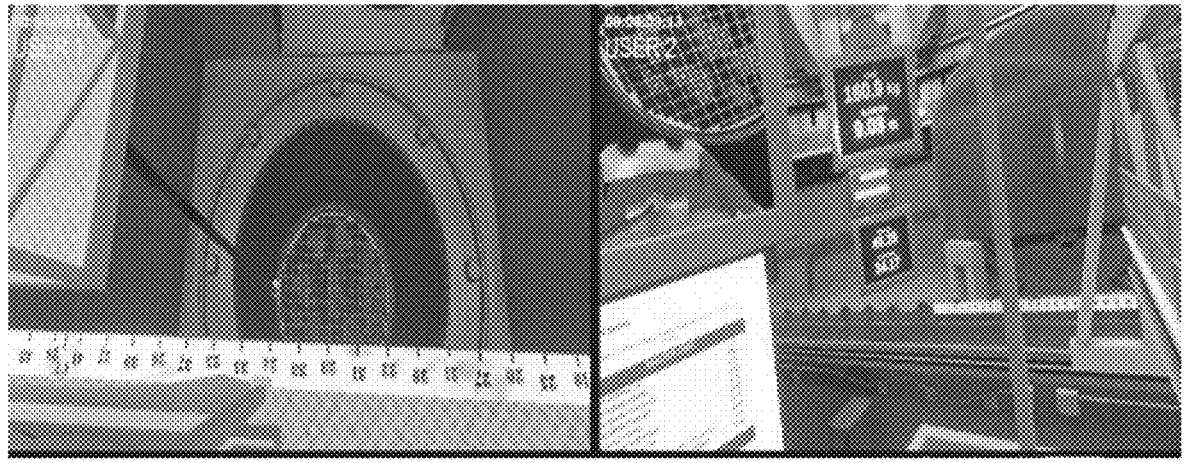
FIGS. 15A and 15B illustrate an example of the first user (e.g., spotter) 1210-R looking in a downward direction and an example of a corresponding scene of a virtual refuel floor environment provided to a VR display of the first user (e.g., spotter) 1210-R, respectively, according to at least some example embodiments.
FIGS. 16A and 16B illustrate an example of the second user (e.g., fuel mover) 1220-R looking in a rightward direction and an example of a corresponding scene of a virtual refuel floor environment provided to a VR display of the second user (e.g., fuel mover) 1220-R, respectively, according to at least some example embodiments.
Figures 15A, 16A:
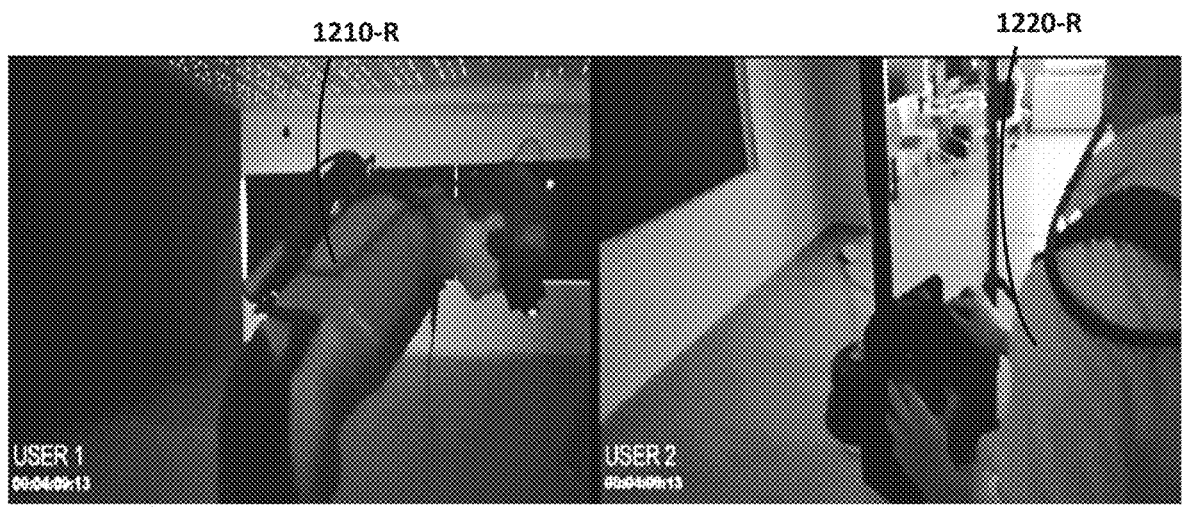

FIG. 15A illustrates an example of the first user (e.g., spotter) 1210-R looking in a downward direction, and FIG. 15B shows a corresponding scene of the virtual refuel floor environment 4050 provided to a VR display 515 of the first user (e.g., spotter) 1210-R. FIG. 16A illustrates an example of the second user (e.g., fuel mover) 1220-R looking in a rightward direction, and FIG. 16B shows an example of a corresponding scene of the virtual refuel floor environment 4050 provided to the VR display 515 of the second user (e.g., fuel mover) 1220-R. FIG. 17A illustrates an example of the first user (e.g., spotter) 1210-R supervising the second user (e.g., fuel mover) 1220-R while the second user (e.g., fuel mover) 1220-R is performing a fuel movement training operation, and FIG. 17B shows an example of a corresponding scene of a virtual refuel floor environment 4050 provided to a VR display 515 of the first user (e.g., spotter) 1210-R.

Figures 17B, 18B:
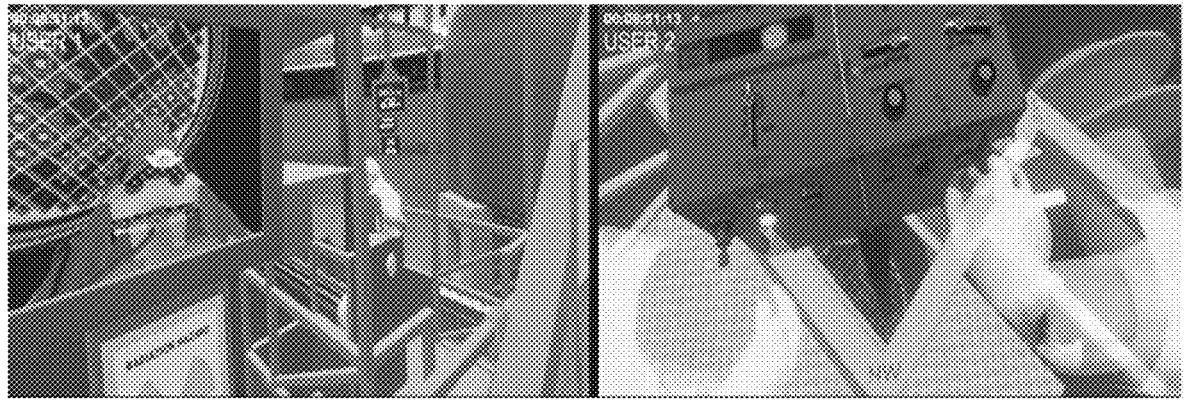
FIGS. 17A and 17B illustrate an another example of a first user (e.g., spotter) 1210-R supervising a second user (e.g., fuel mover) 1220-R who is performing a fuel movement training operation, and another example of a corresponding scene of a virtual refuel floor environment provided to a VR display of the first user (e.g., spotter) 1210-R, respectively, according to at least some example embodiments.
FIGS. 18A and 18B illustrate another example of the second user (e.g., fuel mover) 1220-R performing the fuel movement training operation, and another example of a corresponding scene of a virtual refuel floor environment provided to a VR display of the second user (e.g., fuel mover) 1220-R, respectively, according to at least some example embodiments.
Figures 17A, 18A:
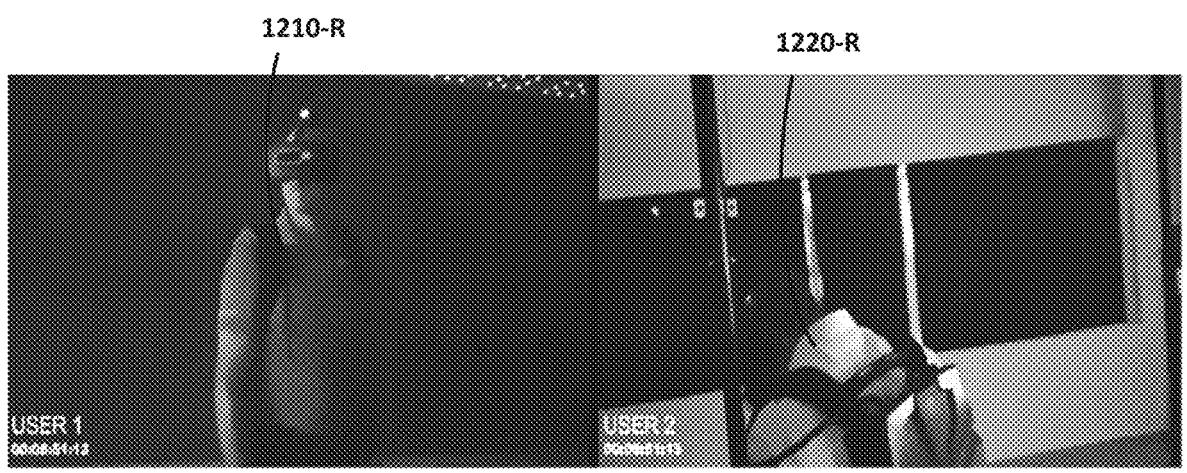
Figures 19B, 20B:
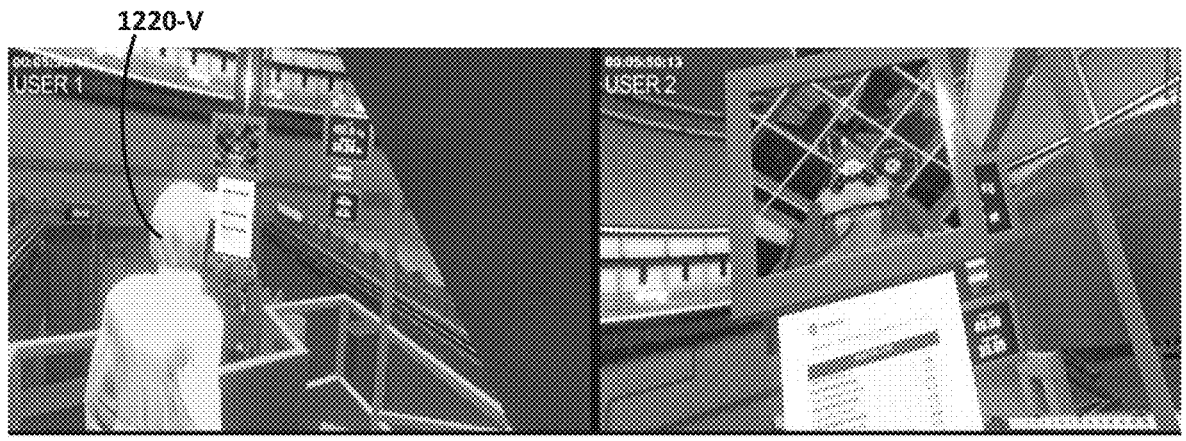
FIGS. 19A and 19B illustrate an example of a first user (e.g., spotter) 1210-R supervising a second user (e.g., fuel mover) 1220-R who is performing a fuel movement training operation, and another example of a corresponding scene of a virtual refuel floor environment provided to a VR display of the first user (e.g., spotter) 1210-R, respectively, according to at least some example embodiments.
FIGS. 20A and 20B illustrate an example of the second user (e.g., fuel mover) 1220-R viewing a mast camera monitor in a virtual refuel floor environment according to at least some example embodiments.
Figures 19A, 20A:
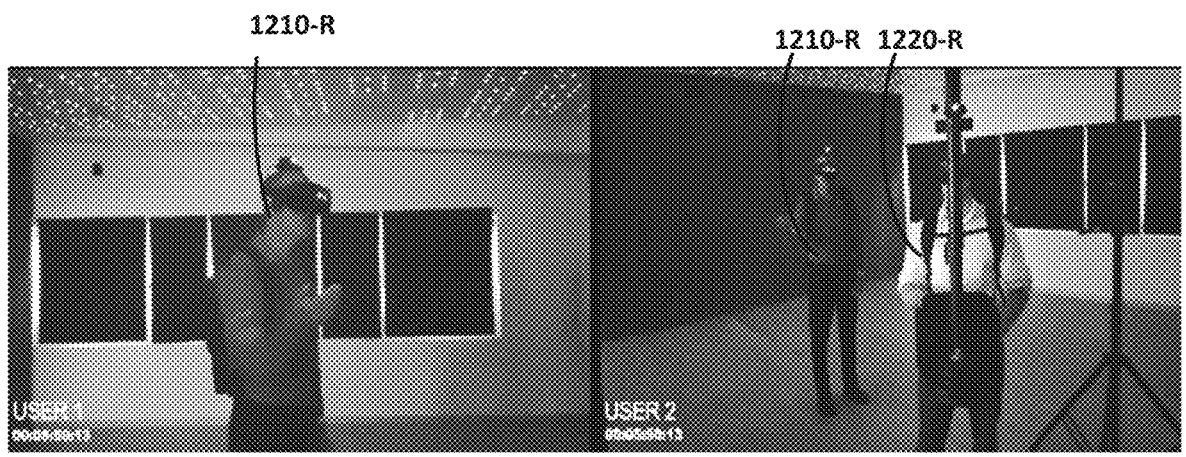

FIG. 18A illustrates another example of the second user (e.g., fuel mover) 1220-R performing a fuel movement training operation, and FIG. 18B shows another example of a corresponding scene of the virtual refuel floor environment 4050 provided to a VR display 515 of the second user (e.g., fuel mover) 1220-R. FIG. 19A illustrates another example of the first user (e.g., spotter) 1220-R supervising the second user (e.g., fuel mover) 1220-R while the second user (e.g., fuel mover) is performing a fuel movement training operation, and FIG. 19B shown another example of a corresponding scene of the virtual refuel floor environment 4050 provided to the VR display 515 of the first user (e.g., spotter) 1210-R. FIG. 20A illustrates an example of the second user (e.g., fuel mover) 1220-R viewing the rear mast camera monitor 710B in the virtual fuel moving platform cab 700 of the virtual refuel floor environment 4050, and FIG. 20B shows the view of the rear mast camera monitor 710B provided to the VR display 515 of the first user (e.g., spotter).

Figures 21B, 22B:
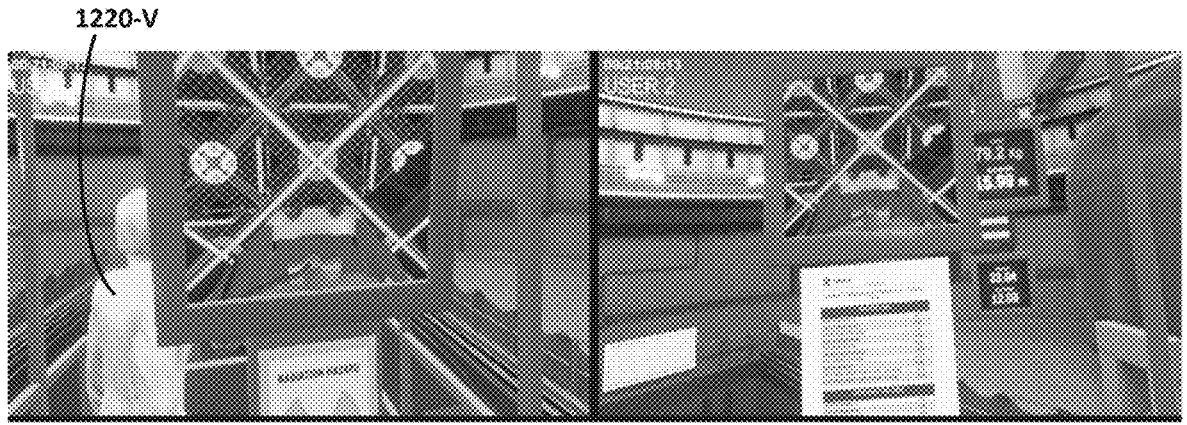
FIGS. 21A, 21B, 22A and 22B illustrate examples of the first (e.g., spotter) and second (e.g., fuel mover) users both viewing respective mast camera monitors in a virtual refuel floor environment according to at least some example embodiments.
Figures 21A, 22A:
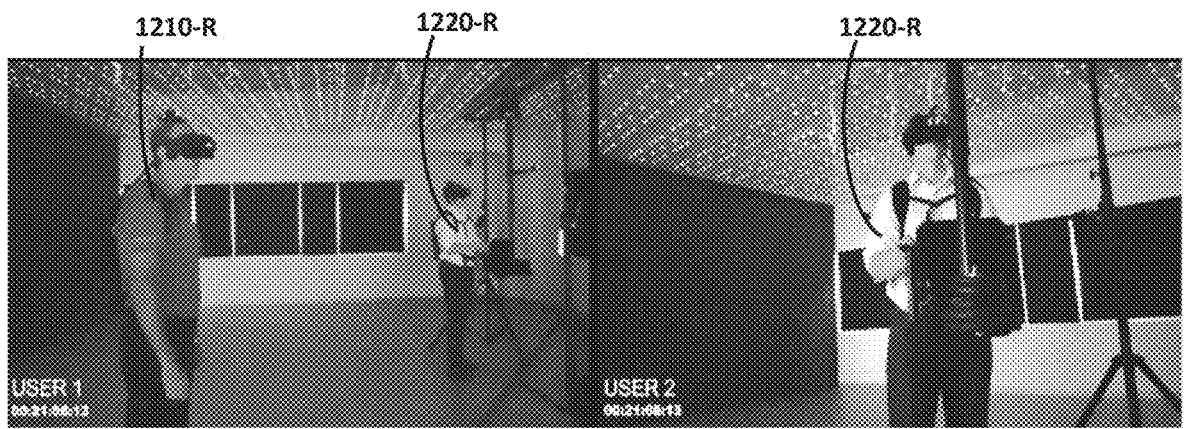

FIGS. 21A and 22A illustrate examples of the first user (e.g., spotter) 1210-R viewing the front mast camera monitor 710A while the second user (e.g., fuel mover) 1220-R views the rear mast camera monitor 710B. FIGS. 21B and 22B show the scenes of the virtual refuel floor environment 4050 respectively provided to the VR display 515 of the first user (e.g., spotter) 1210-R and the second user (e.g., fuel mover) 1220-R.

The fuel movement simulator system according to at least one example embodiment provides an advantage of facilitating the process of training personnel or groups of personnel to perform fuel movement operations. For example, in order for new personnel to become experienced enough to perform the complicated processes associated with the operation of a complex process plant safely, it is important for the new personnel to be able to perform training and team building with respect to the aforementioned complicated processes. For example, often the first time that a SRO meets his fuel movement team is when they assemble on-site for the outage. Ideally, they would have the opportunity to perform team building at an off-site facility prior to the outage. The fuel movement simulator system according to at least one example embodiment provides an advantage of a portable platform for performing such training and team-building.

One example refueling operation training solution includes using a full-sized replica of a relevant portion of the BWR plant for training. Personnel can use the full-sized replica to train by performing the refueling operation as if they are in an actual BWR plant. However, such replicas may be expensive and very large. Accordingly, it may not be practical to build more than a limited amount of such replicas in a limited number of locations. Thus, personnel who wished to train for performing the refueling operation may be required to travel to one of a limited number geographic locations in order to use a full-sized replica for training.

However, the fuel movement simulator system according to at least one example embodiment provides advantages of (i) being usable by personnel of all experience levels without the risk of damage to training equipment and mock-ups, and (ii) being portable such that the refueling operation training solution could be brought to a location that is convenient for the personnel who wish to train, rather than requiring the personnel to travel significant distances in order to train.

The fuel movement simulator system according to at least one example embodiment provides an advantage of supporting safe and relatively compact method for allowing multiple users to practice BWR plant fuel movement operations, together.

The fuel movement simulator system according to at least one example embodiment provides an advantage of reducing an overall fuel moving duration by acclimating fuel movers (e.g., fuel-moving personnel) to the process before work begins inside the reactor. Accordingly, average fuel movement times may be reduced by shortening the time needed for reactor service technicians (RSTs), with or without and senior reactor operators (SROs), to reacclimate to the fuel movement process.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A fuel movement simulator system comprising:
   a virtual reality (VR) system configured to generate a virtual refuel floor environment; and
   a fuel movement simulator assembly configured to provide a physical interface to the virtual refuel floor environment,
   the fuel movement simulator assembly including a replica mast, a replica control console connected to the replica mast, and a support structure configured to support the replica mast and replica control console, wherein the replica control console is connected to the support structure via the replica mast.

2. The fuel movement simulator system of claim 1 wherein the support structure comprises:
   a connector, and
   the replica mast is connected to the connector.

3. The fuel movement simulator system of claim 2, wherein the connector supports one or more degrees of freedom such that the replica mast and replica console are movable relative to the support structure.

4. The fuel movement simulator system of claim 3 wherein the support structure further comprises:
   a plurality of vertical supports; and
   a horizontal support supported by the plurality of vertical supports.

5. The fuel movement simulator system of claim 4, wherein
   the connector is connected to the horizontal support, and
   the replica mast is connected to the horizontal support via the connector such that the replica console is rotatable about a central axis of the replica mast relative to the horizontal support.

6. The fuel movement simulator system of claim 1, wherein VR system comprises:
   a plurality of tracker ceiling panels configured to emit infrared (IR) light.

7. The fuel movement simulator system of claim 6, wherein the replica mast includes a sensor configured to generate signals indicating an orientation of the replica mast based on IR light emitted by one or more of the plurality of tracker ceiling panels.

8. The fuel movement simulator system of claim 7, wherein the VR system further comprises:
   a VR headset including,
      a tracker configured to generate signals for tracking a position and of a user wearing the VR headset based on IR light emitted by one or more of the plurality of tracker ceiling panels, and
      a VR display configured to display, to the user, a scene of the virtual refuel floor environment.

9. The fuel movement simulator system of claim 1, wherein the VR system is configured to generate the virtual refuel floor environment such that the virtual refuel floor environment includes a virtual fuel moving cab, a reactor pool, and a reactor core inside the reactor pool.

10. The fuel movement simulator system of claim 9, wherein the virtual fuel moving cab includes a virtual mast and a virtual control console corresponding to the replica mast and replica control console, respectively.

11. A fuel movement simulator assembly comprising:
    a replica mast;
    a replica control console connected to the replica mast; and
    a support structure configured to support the replica mast and replica control console,
    wherein the replica control console is connected to the support structure via the replica mast.

12. The fuel movement simulator assembly of claim 11 wherein the support structure comprises:
    a connector, and
    the replica mast is connected to the connector.

13. The fuel movement simulator assembly of claim 12, wherein the connector is configured to support one or more degrees of freedom such that the replica mast and replica console are movable relative to the support structure.

14. The fuel movement simulator assembly of claim 13 wherein the support structure further comprises:
    a plurality of vertical supports; and
    a horizontal support supported by the plurality of vertical supports.

15. The fuel movement simulator assembly of claim 14 wherein
    the connector is connected to the horizontal support and the replica mast is connected to the horizontal support via the connector such that the replica console is rotatable about a central axis of the replica mast relative to the horizontal support.

16. The fuel movement simulator assembly of claim 15, wherein the replica mast includes a sensor configured to generate signals indicating an orientation of the replica mast.

* * * * *